(12) United States Patent
Beardwell et al.

(10) Patent No.: US 10,201,954 B2
(45) Date of Patent: Feb. 12, 2019

(54) METALLIZED MULTI-LAYER STRUCTURE FILM FOR IN-MOLD LABELS, PRINTED IN-MOLD LABELS FORMED FROM SUCH FILM AND METHODS OF APPLYING THE PRINTED LABELS TO AN ARTICLE DURING THE MOLDING OF THE ARTICLE

(71) Applicant: TAGHLEEF INDUSTRIES PTY LTD., Wodonga (AU)

(72) Inventors: Roger Beardwell, Wodonga (AU); Steven Hodgson, Wodonga (AU)

(73) Assignee: Tagleef Industries PTY Ltd., Wodonga, Victoria (AU)

( * ) Notice: Subject to any disclaimer, the term of this patent is extended or adjusted under 35 U.S.C. 154(b) by 320 days.

(21) Appl. No.: 14/890,490

(22) PCT Filed: May 2, 2014

(86) PCT No.: PCT/IB2014/000665
§ 371 (c)(1),
(2) Date: Nov. 11, 2015

(87) PCT Pub. No.: WO2014/184630
PCT Pub. Date: Nov. 20, 2014

(65) Prior Publication Data
US 2016/0107420 A1  Apr. 21, 2016

Related U.S. Application Data

(60) Provisional application No. 61/937,704, filed on Feb. 10, 2014, provisional application No. 61/897,872, (Continued)

(51) Int. Cl.
*B29C 45/14* (2006.01)
*B44C 1/17* (2006.01)
(Continued)

(52) U.S. Cl.
CPC ........ *B32B 15/08* (2013.01); *B29C 45/14311* (2013.01); *B29C 45/14467* (2013.01);
(Continued)

(58) Field of Classification Search
CPC ......... B32B 15/08; B32B 27/32; B32B 27/08; B32B 7/12; B32B 2255/10;
(Continued)

(56) References Cited

U.S. PATENT DOCUMENTS

| | | | |
|---|---|---|---|
| 5,118,563 A | 6/1992 | Akao | |
| 5,122,906 A * | 6/1992 | Wheatley | B32B 7/02 |
| | | | 359/586 |

(Continued)

FOREIGN PATENT DOCUMENTS

| | | |
|---|---|---|
| JP | 2007-264373 A | 10/2007 |
| WO | 2005100019 A2 | 10/2005 |

OTHER PUBLICATIONS

International Search Report for PCT/IB2014/000665 dated Aug. 6, 2014.

*Primary Examiner* — Carson Gross
*Assistant Examiner* — Christian Roldan
(74) *Attorney, Agent, or Firm* — Caesar Rivise, PC

(57) ABSTRACT

A multilayer, metallized, laminate film employed to form in-mold labels, includes first and second multilayer structures adhesively bonded together. The first multilayer structure (12) includes a polymer core layer (16) and first and second outer polymer layers on opposed sides of the core layer. The first outer polymer layer (18) includes a metal layer (22) thereon, and the second polymer layer (20) having an outer matte surface that is adapted, in the in-mold label formed from laminate film, to engage and bond to a molded article. The second multilayer structure (14) is a clear structure including a core layer (16') and first (18') and (Continued)

second (20') outer polymer layers on opposed sides of the core layer. The bonded interface of the first and second multilayer structures is free of any printed indicia or other graphics. Preferably both outer surfaces of the film are bottom outer layers and include matte surfaces. A label in accordance with this invention is formed from the above-described laminate film by printing an outer surface of the film either before or after the film/label is printed.

7 Claims, 1 Drawing Sheet

Related U.S. Application Data filed on Oct. 31, 2013, provisional application No. 61/824,077, filed on May 16, 2013.

(51) Int. Cl.
  *B32B 15/08*  (2006.01)
  *B29C 65/70*  (2006.01)
  *B32B 7/12*  (2006.01)
  *B32B 27/08*  (2006.01)
  *B32B 27/32*  (2006.01)
  *B29K 705/00*  (2006.01)
  *B29L 31/00*  (2006.01)

(52) U.S. Cl.
  CPC ............... *B29C 65/70* (2013.01); *B32B 7/12* (2013.01); *B32B 27/08* (2013.01); *B32B 27/32* (2013.01); *B29C 2045/14918* (2013.01); *B29K 2705/00* (2013.01); *B29L 2031/744* (2013.01); *B32B 2255/10* (2013.01); *B32B 2255/205* (2013.01); *B32B 2307/518* (2013.01); *B32B 2307/538* (2013.01); *B32B 2307/732* (2013.01); *B32B 2307/75* (2013.01); *B32B 2519/00* (2013.01); *B44C 1/1712* (2013.01)

(58) Field of Classification Search
  CPC ........ B32B 2307/518; B32B 2307/538; B32B 2255/205; B32B 2307/732; B32B 2307/75; B32B 2519/00; B29C 65/70; B29C 45/14311; B29C 45/14467; B29C 2045/14918; B29L 2031/744; B29K 2705/00; B44C 1/1712
  USPC .......................................................... 156/245
  See application file for complete search history.

(56) References Cited

U.S. PATENT DOCUMENTS

| | | |
|---|---|---|
| 2009/0011183 A1 | 1/2009 | Kochem et al. |
| 2009/0297820 A1 | 12/2009 | Kovalchuk et al. |
| 2011/0223362 A1* | 9/2011 | Van Loon ......... B29C 45/14688 428/34.1 |
| 2012/0058304 A1 | 3/2012 | Jung et al. |
| 2016/0016424 A1* | 1/2016 | Molina ................ B32B 27/10 428/337 |

* cited by examiner

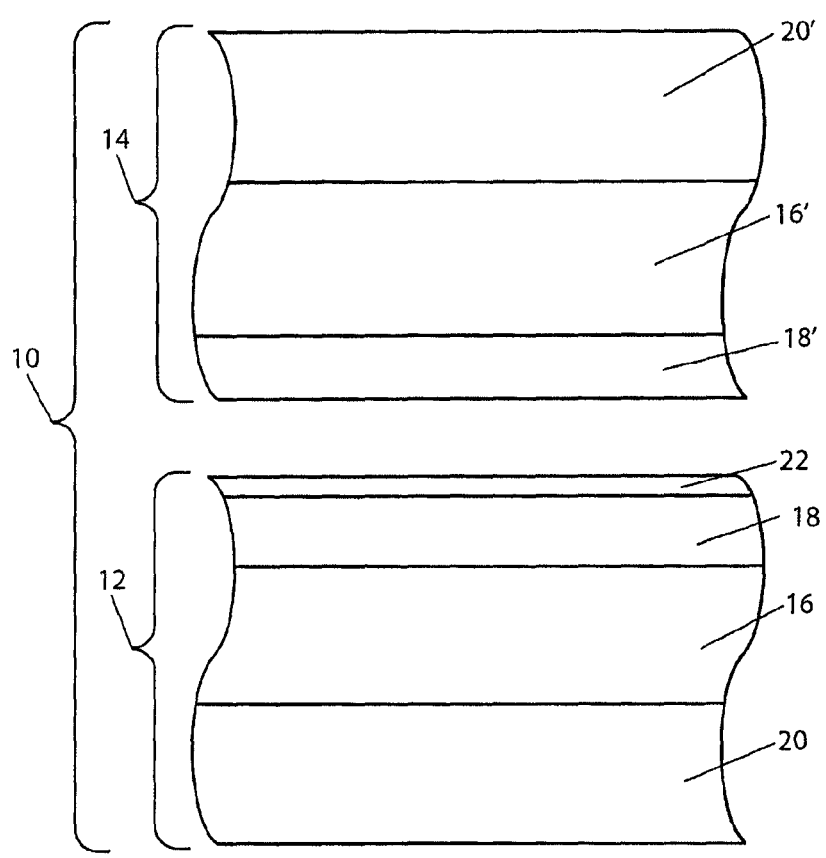

METALLIZED MULTI-LAYER STRUCTURE FILM FOR IN-MOLD LABELS, PRINTED IN-MOLD LABELS FORMED FROM SUCH FILM AND METHODS OF APPLYING THE PRINTED LABELS TO AN ARTICLE DURING THE MOLDING OF THE ARTICLE

RELATED APPLICATIONS

This non-provisional application claims the benefit under 35 U.S.C. § 119(e) of the following: (1) application Ser. No. 61/824,077, filed May 16, 2013, entitled METALLIZED LAMINATE FILM FOR IN-MOLD LABELS, PRINTED IN-MOLD LABELS FORMED FROM SUCH FILM AND METHODS OF APPLYING THE PRINTED LABELS TO AN ARTICLE DURING THE MOLDING OF THE ARTICLE; (2) application Ser. No. 61/897,872, filed on Oct. 31, 2013, entitled METALLIZED LAMINATE FILM FOR IN-MOLD LABELS, PRINTED IN-MOLD LABELS FORMED FROM SUCH FILM AND METHODS OF APPLYING THE PRINTED LABELS TO AN ARTICLE DURING THE MOLDING OF THE ARTICLE and (3) application Ser. No. 61/937,704, filed on Feb. 10, 2014, entitled METALLIZED LAMINATE FILM FOR IN-MOLD LABELS, PRINTED IN-MOLD LABELS FORMED FROM SUCH FILM AND METHODS OF APPLYING THE PRINTED LABELS TO AN ARTICLE DURING THE MOLDING OF THE ARTICLE, and all of whose entire disclosures are incorporated by reference herein.

FIELD OF THE INVENTION

This invention related to metallized laminate films specifically designed for the fabrication of in-mold labels, to printed, in-mold labels formed from such films and to methods of applying the labels to an article in an in-mold labeling operation.

BACKGROUND OF THE INVENTION

A prior art, metallized in-mold label structure is disclosed in U.S. Publication No. 2011/0223362.

The film disclosed in the '362 published application is a laminate structure including two co-extruded multi-layer films that are adhesively bonded together. In this structure the inner surface of one of the multi-layer films is initially metallized, and an inner surface of the other laminate is provided with the desired printed material/graphics prior to bonding that inner surface to the metallized layer with a suitable adhesive. The multi-layer film adhered to the metallized structure is a clear film, thereby permitting visual observation of the graphics through that layer. Indeed, reverse print laminations are common structure for packaging lamination films.

In summary, in the structure disclosed in the '362 published application the graphics are sandwiched between the multi-layer metallized film layer and the multi-layer clear film layer. Moreover, this published application does not recognize any potential problem with film curl or any solution to such a problem. Curl can pose a substantial problem when the film is intended to be fed in sheet form into a printer for providing visible indicia thereon and also during label placement during the molding process Although the in-mold label structure disclosed in the '362 application may function in a satisfactory manner for some applications, the multi-layer film, prior to formation into a label structure, needs to include the required printed indicia at the interface between the clear layer and the metallized layer. Thus, the multi-layer film needs to be custom manufactured with the desired printing prior to being sold to a customer for conversation into in-mold labels. The film does not have the generic capability of being sold to various different label manufacturers for conversion into a printed, in-mold label.

Timmerman U.S. Publication No. 2013/0302591 discloses a number of different embodiments of metallized film structures for use as in-mold labels. However, this publication does not recognize any potential problem relating to film curl or any solution to such a problem.

U.S. Pat. No. 5,653,844, issued to Abrams, discloses a multi-layer foil laminate in which a plastic film exterior layer is printed on an inner surface that is secured to a foil layer through an adhesive, and also to on an exterior, outer surface. Although this film may have possible label applications, as disclosed generally in the paragraph beginning on line 19 of column 3, there clearly is no teaching or suggestion that this film is suitable for use in forming an in-mold label structure. Moreover, the laminate structure disclosed in the '844 patent employs printed indicia at the adhesive interface of the two laminate film structures, and therefore suffers from the same deficiency as the above discussed '362 published application. In addition, the '844 patent does not recognize any problem with respect to film curl or any solution to such a problem.

Jung U.S. Publication No. US20120058304 discloses a film for use in an in-mold label and employs matt surfaces on each of the opposed surfaces. Although this publication discloses that an outer surface can be metallized or printed, it does not disclose any arrangement for forming a metallized in-mould label with printed indicia on an outer surface thereof.

It is important to note that this invention relates specifically to a metallized, multi-layer film that is constructed to be cut into individual sheets for feeding through a printing press to thereby fabricate printed in-mold label structures. Such in-mold label films are required to have properties that may not exist or be present in other prior art multi-layer films employed for general label applications, e.g., wrap-around labels, heat seal labels, etc. For example, one problem that needs to be addressed in metalized in-mold labels and in films from which such labels are formed is the problem of curl. When excessive curl exists in the film and the film is cut into individual sheets for subsequent printing, it can be a problem to effectively direct the sheets through the printing press to achieve a high quality printing of the labels. Also, curl in individual labels can be problematic during placement in molding operations.

SUMMARY OF THE INVENTION

Multi-layer metallized, laminate films employed to form in-mold labels in accordance with this invention include first and second multi-layer structures. The first multi-layer structure preferably is a clear structure and in all embodiments of this invention includes a polymer core layer and first and second outer polymer layers on the opposite sides of the core layer, respectively. The first outer polymer layer includes a metal layer thereon, and this metal layer constitutes a surface layer of the first multi-layer structure. The second outer polymer layer is on an opposite side of the core from the first polymer layer and includes a matte surface that, in an in-mold label formed from the film, is adapted to engage and bond to an article as it is being molded.

The second multi-layer structure can be varied in different embodiments of this invention. In one embodiment the laminate film of this invention is a clear structure including a core layer and first and second polymer layers on opposed sides of the core layer and providing outer surfaces of the second multi-layer structure. An adhesive layer is provided to bond the metal layer of the first multi-layer structure to an outer surface of the second multi-layer structure and that bonded interface is free of any printed indicia. This is desirable feature of the present invention.

Reference throughout this application to the second multi-layer structure being "clear" includes within its scope multi-layer structures including a matte surface, provided that at least a portion of the appearance of an internal metal layer of the structure is visible through the matte surface. Excluded from the definition of "clear" multi-layer structures are those structures that are opaque or white, such as can result from the inclusion of voiding agents in one or more of the layers of the multi-layer structure or the inclusion of a whitening agent or pigment, such as talc, to one or more of the layers of the multi-layer structure.

Reference throughout this application to a "top" and "bottom" outer layers of a multilayer structure refers to the orientation of the outer layers going through an extruder.

Applicant discovered that when the metal layer is formed on the top outer layer of the first multi-layer structure and the bottom outer layer of the second multi-layer structure is adhesively attached to the metal layer in a high speed lamination process an undesired curling of the laminate occurred. When this laminate was cut into sheets prior to being directed into a printing operation it was difficult to properly direct the sheets through the printer to obtain a high quality printing of the sheets on the top surface of the second multi-layer structure of the laminate. Such high quality printing is an essential requirement in in-mold labels formed from the laminate. Although the exact cause of the curl problem is not completely understood applicants believe that one possible mechanism at play is that during the formation of multi-layer structures in an extruder the formed, extruded structure is not completely balanced; thereby causing some curl to occur in a predetermined direction, e.g., in a downward direction passing through the extruder. When two, multi-layer structures are formed in the same or similar extrusion operation it is possible that each structure will tend to curl slightly in the same direction. When the bottom outer layer of the second multi-layer structure is adhesively secured to the metal layer applied to the top outer layer of the first multi-layer structure it is believed that the same possible direction of curl in each of the multi-layer structures will result in curl being maintained, which in turn will maintain the problem of printing the top outer layer of the second multi-layer structure of the film to form a printed, metallized label structure in accordance with this invention. In fact, if the direction of curl is in the same direction in both the first and second multi-layer structure when they are adhered together the curling problem can be exacerbated.

Applicant has determined that it is important to optimize process parameters to provide uniform tensions across both multilayer sheets during the lamination stage, prior to the sheets passing through a bonding nip to form the laminate structure. In addition, applicant has solved or minimized the curling problem by a unique variation in an otherwise common laminating process.

In a preferred embodiment of this invention the top outer layer of the second multi-layer structure is adhesively bonded to the metal layer applied to the top outer layer of the first multi-layer structure. Most preferably the first and second multi-layer structures each are formed by coextrusion under substantially the same processing conditions; most preferably as part of the continuous formation on a single extrusion line of identical multilayer components. Thus, any curl that results during the process should be in the same direction in both of the multilayer structures. By adhesively bonding the top outer layer of the second multilayer structure to the metalized surface of the top outer layer of the first multilayer structure any undesired curl in each of the structures will cancel or offset each other to thereby either eliminate or minimize the curl problem.

More preferably the bottom outer layer of the second multi-layer structure should be formed with a matte surface, to thereby enhance its receptivity for printing inks. In this laminated film structure both outer surfaces of the metallized laminate will include matte surfaces.

As noted earlier, in the most preferred embodiment of this invention the second multi-layer structure can be, and preferably is the same as the first multi-layer structure, whereby adhesively bonding the top outer layer of the second multi-layer structure to the metal layer applied to the top outer layer of the first multi-layer structure will result in the opposed outer surfaces both being matte surfaces, and the direction of curl of each of the multi-layer structures, if any, tending to cancel each other to thereby eliminate or minimize the printing problem resulting from excess curling of the film or label to be printed. This is a particularly troublesome problem in a conventional printing operation in which the continuous laminate is formed into individual sheets that each need to be properly directed into the printing nip to provide the desired printing operation. Excess curl can cause improper feeding of each sheet into the printing nip and during label molding operations.

In the preferred embodiments of this invention the core layer and the first and second polymer layers of each of the first and second multi-layer structures are co-extruded structures.

In accordance with this invention the first and second polymer layers of each of the first and second multi-layer structures can be co-extruded directly on the core layer, or can be co-extruded with a separate tie layer disposed between the core layer and the first and second polymer layers.

The core layer can be formed through a single extrusion slot or through multiple, adjacent extrusion slots. In one commercially available tenter device five extrusion slots are provided, with the center three slots extruding the same polymer blend to form a core layer, and with the two outer slots being employed to form the first and second polymer layers on the opposed sides of the core layer.

In accordance with this invention an in-mold label is formed from the above described multi-layer laminate film and an outer surface of the second multi-layer structure opposed to the outer surface bonded to the metal layer includes printed indicia thereon. In other words, the converter of the film is free to include any desired printed indicia thereon and therefore can utilize the metallized laminate film to fabricate in-mold labels for a variety of different end users. This is not possible with the prior art metallized in-mold film structures of the type disclosed in the '362 prior art publication.

Moreover, in accordance with this invention the multi-layer laminate film, prior to printing, is first sheeted and the individual sheets are directed through the printing operation. In this process any excess curling of the laminate film, and the corresponding sheets formed therefrom, can result in the inability to provide the required printing on the sheets in a high speed printing operation. When individual sheets need to be processed in the printing press the leading edge of each sheet needs to be properly received in the printing nip. Thus if each sheet, or a multiple number of sheets have an excessive curl in them, the high speed printing operation can come to a grinding halt.

In accordance with this invention the printed indicia can be on the outer surface of the label adapted to engage an inner mold surface during the formation (e.g., injection molding) of a molded article. Alternatively, a clear, protective layer can be applied over the printed indicia to protect the printed material by engaging an inner mold surface during the formation of the molded article. When a protective layer is employed it is preferred to include it on the extruded laminate prior to the sheeting of the laminate for printing. However, in either event the metallized multi-layer film as manufactured does not include any printed indicia at the bonding interface of the two multi-layer laminates forming the film of this invention and the appearance of the metal layer is visually discernible.

This invention also includes the attachment of the aforementioned, printed, in-mold labels to an article during the molding of the article by positioning the label in the mold with a matte surface thereof facing the mold cavity to engage and bond to an article formed in the mold cavity by any conventional molding operation, e.g., injection molding.

This invention also resides in a method of forming in-mold labels from adhesively bonded multi-layer structures, each of which includes the same polymer composition and is formed on the same extrusion line.

BRIEF DESCRIPTION OF THE DRAWING

The invention may be more fully understood with reference to the accompanying drawing, which is a schematic, exploded view of one embodiment of this invention showing the construction of two multi-layer structures separated from each other and to be adhesively bonded together to form a multi-layer, metallized, laminate film of this invention that is employed to form in-mold labels in accordance with this invention.

DESCRIPTION OF THE PREFERRED
EMBODIMENTS OF THE INVENTION

A multi-layer, metallized, laminate film employed to form in-mold labels in accordance with the most preferred embodiment of this invention is indicated at 10 in the FIGURE. This laminate film includes first and second multi-layer structures 12 and 14 that are adhesively bonded together as will be described in greater detail hereinafter.

The preferred thickness of the film 10 is in the range of 40-120 microns. For small and medium size containers up to about 4 liters the preferred thickness range is 40-80 microns; more preferably in the range of 55-70 microns and most preferably about 60 microns. However, in the molding of larger containers such as plastic pails that can have up to a 20 liter capacity, the upper limit preferably is on the order of 100 microns, but if necessary can be extended to 120 microns. Also, it should be understood that the thickness of the film generally is varied or changed by adjusting the thickness of the core layer, without materially changing the thickness of the other layers in the laminate.

In accordance with this invention, as will be explained in greater detail hereinafter, top outer layer 18' of multi-layer structure 14 is adhesively secured to metal layer 22 formed on the top outer layer 18 of multi-layer structure 12. Most preferably the two multi-layer structures are formed on the same extrusion line from the same components; and preferably from the same production run. Thus, if the extruded film tends to curl in a particular direction, bonding the top outer layer 18' of the second multi-layer structure 14 to the metal layer 22 applied to the top outer layer 18 of the first multi-layer structure will tend to minimize or eliminate the curl problem. As noted earlier, a curl problem can be particularly significant when the film is cut and stacked into individual sheets to be directed into a sheet fed printer.

Referring to the FIGURE, the multi-layer structure 12 is a metallized structure including a core layer 16 and opposed first and second polymer layers 18 and 20 co-extruded with said core layer in a conventional manner; preferably in a tenter machine. In the most preferred embodiment of this invention the co-extruded laminate is biaxially oriented in the tenter machine in a manner that is well known to individuals skilled in the art.

In one commercial tenter machine an extrusion head includes five (5) extrusion slots and the polymers extruded through the central three slots are identical to form the core layer.16. The opposed first and second polymer layers 18 and 20 are formed through the two outer slots.

After co-extrusion a very thin metal layer 22 is deposited on top polymer layer 18 by any well-known application method such as by vapor deposition; preferably to a thickness of less than 0.1 microns. In the preferred embodiment of this invention the metal layer 22 is aluminum, however, any well-known metal or metal oxide disclosed in the prior art for use in a metallized film structure may be employed in this invention.

Most preferably the thickness of the metallized laminate structure 12 is in the range of 20 to 50 microns; more preferably in the range of 25-35 microns and most preferably approximately 30 microns. The core layer 16 of the laminated structure 12 preferably is formed predominantly of polypropylene homopolymer or of a copolymer of propylene with another olefin in an amount that does not negatively impact the properties that make polypropylene desirable for the core layer. Representative copolymers utilized in this invention generally are referred to as mini random copolymers and include less than 2% polyethylene in the copolymer and more preferably less than 1%.

Unless the context indicates otherwise, the reference herein to polypropylene is intended to indicate either an isotactic homopolymer of propylene or a copolymer of propylene with an α-olefin, said α-olefin being present in an amount that does not negatively impact the properties that make propylene desirable for use in forming the core layer.

In a representative embodiment of this invention the core layer 16 is formed from about 98.3%-98.9%, by weight, based on the weight of the core layer, of a propylene homopolymer sold by Lyondellbasell in Geelong, Victoria, Australia under the designation Lyondellbasell HP 516 J, and about 1.1%-1.7%, based on the weight of the core layer, of a slip/antistatic masterbatch including erucamide and ethoxylated amine; sold under the designation Ampacet Grade 50860K, manufactured by Ampacet in Rayong 21140 Thailand. This Ampacet masterbatch includes, by weight, 4% erucamide, 4% ethoxylated amine and 8% glycerol mono stearate in 84% polypropylene homopolymer. In a representative embodiment wherein the label is used in the molding of medium size containers the core layer thickness preferably is in the range of 25-27 microns thick. However, the thickness can be varied without departing from the spirit and scope of the broadest aspects of this invention, and in the molding of large containers the thickness of the core layer will be greater than 26.2 microns.

The outer, top polymer layer 18 to which the metal layer 22 subsequently is to be applied is formed of a propylene/ethylene copolymer wherein the ethylene content is present in a weight percent of about 4%. A representative C2C3 copolymer employed in this invention is supplied under the designation Ineos KS414 by Ineos Olefins and Polymers Europe, located in Brussels Belgium. In the preferred embodiment of this invention the outer surface of layer 18 is oxidatively treated to enhance metal adhesion to that surface; preferably by plasma treatment in a gaseous environment of oxygen and argon. Preferably the polymer layer 18 has a thickness in the range of 0.5 to 2.0 microns and more preferably is about 0.8-1.0 microns. However, the thickness can be varied without departing from the spirit and scope of the broadest aspects of this invention.

The opposed outer polymer layer 20 preferably includes, based upon the weight of that polymer layer, 75%, by weight, of a matte masterbatch blended with 25%, by weight of a C2C3 copolymer, such as the Ineos KS414 copolymer described earlier herein. A preferred matte masterbatch is sold under the designation Tosaf MTO523DP by Tosaf Compounds Ltd of Kfar-Yona, Israel. It is believed that this latter masterbatch consists of 50%, by weight of a C2C3 copolymer and 50% by weight of a high density polyethylene. Specifically, this is a blend of incompatible polymers that form different phases when mixed and thereby provide the matte surface or finish. Preferably the thickness of the polymer layer 20 is in the range of 1.5 to 5.0 microns and more preferably is about 3 microns. However, the thickness can be varied without departing from the spirit and scope of the broadest aspects of this invention.

In accordance with the preferred embodiments of this invention, the multi-layer laminate 14 is secured to the multi-layer laminate 12 by any suitable adhesive.

As noted earlier, in accordance with the most preferred embodiment of this invention the multi-layer laminate 14 is of an identical construction to the multi-layer structure 12, with the individual layers of the structure 14 being identified by the same numerals as the corresponding layers of the structure 12, but with a prime (') suffix. In particular, the thickness ranges and compositions specified for the layers 16, 18, 20 and 22 are the same for the layers 16', 18', 20' and 22 of the laminate structure 14. The only difference between laminate 12 and 14 is that it may not be necessary to oxidatively treat the top outer layer 18' of laminate 14 since it will be adhesively secured to the metal layer 22, as opposed to having a metal layer deposited thereon, as is the case with top outer layer 18 of the laminate 12. However, oxidatively treating each of the outer surfaces in both of the laminates 12, 14 is within the scope of this invention.

In the most preferred construction, it should be apparent that the bottom outer surfaces 20, 20' are the outer surfaces of the multi-laminate structure 10; both having matte surfaces. It has been determined that a matte surface can be very desirable for receiving printing inks thereon, as well as for providing a desired surface roughness for attachment to an article in an in-mold labeling operation.

In accordance with this invention the printed labels are attached to an article in an in-mold labeling operation by positioning an in-mold label of this invention in a mold with the printed surface facing and contiguous to the mold surface and a matte surface facing and communicating with the mold cavity in which a molded article is to be formed. The article is then molded in the cavity (e.g., injection molded) to both form the article and attach the in-mold label to the article. In the most preferred embodiment the opposed outer surface is a matte surface provided with printed indicia thereon.

As noted earlier, in the most preferred embodiments each of the laminates 12, 14 are formed of the same construction; preferably from the same production run on the same extrusion device. Also as noted earlier, commercially available tenter equipment used by applicant includes a five (5) slot extrusion die with the same composition being extruded through the central three slots to essentially form a uniform core layer. It should be understood that in accordance with this invention a three slot extrusion die could be employed to form the central core and the outer skin layers, respectively.

The presently preferred formulation of each of the laminates 12, 14 is a follows:

Core layers 16, 16' (formed through 3 of the slots)—about 98.9%, by weight, based on the weight of the core layer, of a propylene homopolymer sold by Lyondellbasell in Geelong, Victoria, Australia under the designation Lyondellbasell HP 516 J, and about 1.1%, by weight, based on the weight of the core layer, of a slip/antistatic masterbatch including erucamide and ethoxylated amine; sold under the designation Ampacet Grade 50860K, manufactured by Ampacet in Rayong 21140 Thailand. As noted earlier, this Ampacet masterbatch includes, by weight, 4% erucamide, 4% ethoxylated amine and 8% glycerol mono stearate in 84% polypropylene homopolymer.

Top outer layers 18, 18'—propylene/ethylene copolymer wherein the ethylene content is present in a weight percent of about 4%. A representative C2C3 copolymer employed in this invention is supplied under the designation Ineos KS414 by Ineos Olefins and Polymers Europe, located in Brussels Belgium and identified earlier in this application Bottom outer layers 20, 20'—75%, by weight, of a matte masterbatch blended with 25%, by weight of a C2C3 copolymer, such as the Ineos KS414 copolymer described earlier herein. A preferred matte masterbatch is sold under the designation Tosaf MTO523DP by Tosaf Compounds Ltd of Kfar-Yona, Israel.

In the most preferred embodiment of this invention the thickness of each of the core layers 16, 16' is 26 microns; the thickness of each of the top layers 18, 18' is 1 micron and the thickness of each of the bottom layers 20, 20' is 3 microns.

In the preferred construction each of the outer surfaces of each of the laminates 12, 14 are oxidatively treated; preferably by corona treatment. The treatment makes the surfaces more receptive to printing, metallizing and also adhesively bonding the laminates together to form the film 100.

As noted earlier, in the most preferred embodiment of this invention the laminates 12, 14 preferably are formed on the same extrusion equipment with the same settings; most preferably from the same extrusion run. Therefore, when the top surface 18' of laminate 14 is adhesively bonded to the metal layer 22 adhered to the top surface 18 of the laminate 12 any curling of each of the laminates 12, 14 will be in the same direction, as formed, and when bonded to each other as described above any curl will be in the opposite directions and tend to nullify, or cancel each other.

The most preferred adhesive for bonding the laminates 12, 14 together is a solventless adhesive and the bonding generally is provided by a contract laminator that acquires the laminates from a film manufacturer, such as Taghleef.

In addition to curl, another key parameter that needs to be minimized is static. The present formulation, as noted earlier, contains antistatic agents at a carefully controlled quantity which provides antistatic effect without affecting print performance. However, in accordance with this invention additional static controls are provided on the laminator to provide for successful converting by sheet-fed printers. Specifically, an AC static bar was fitted on the laminator; successfully eliminating static charge.

Post lamination, rolls in accordance with this invention were conditioned for 4-7 days in a temperature controlled environment of 40° C. to enable adhesive to cure. Post cure, the rolls were slit to a desired width, packed and then dispatched to the sheet-fed printer. No additional static control was required during the slitting operation under current set-up, but this may be required if done elsewhere.

It should be noted that the principal benefits of this invention are in the formation of in-mold labels that are printed with visible indicia on sheet fed printers. It is the requirement of obtaining acceptable printing on the labels through sheet-fed printers that makes curl and antistatic control so important. In addition, providing a matte surface on both the print side and the container engaging surface of the in-mold label enhances both the print quality and the retention of the label to a molded article.

In accordance with this invention print and bond receptivity are enhanced by the oxidative treatment of the opposed matte surfaces 20, 20'; preferably by corona treatment.

Initial test results show that the application of the in-mold, metallized label 10 of this invention to a molded plastic container improves the barrier of that container to both moisture and oxygen.

Although the present invention has been described in connection with preferred embodiments thereof, it will be appreciated by those skilled in the art that additions, modifications, substitutions and deletions not specifically described may be made without departing from the spirit and scope of the invention defined in the appended claims. For example, although the multi-layer structures 12, 14 had been described as three layer films, it is to be understood that multi-layer structures having additional layers, such as additional polymer layers, tie layers, etc. are also within the scope of the present invention. In other words, the number of layers in each of the structures does not constitute a limitation on the broadest aspects of this invention.

What is claimed is:

1. An in-mold label including extruded first and second multilayer structures, said first and second extruded multilayer structures each including a polymer core layer and first and second outer polymer layers on opposed sides of the core layer, said first and second outer polymer layers being thinner than said core layer, said first outer polymer layer of each multilayer structure being a top outer layer of the respective, extruded multilayer structure and the second outer polymer layer of each multilayer structure being the bottom outer polymer layer of the respective, extruded multilayer structure, at least one of the bottom polymer layers having an outer matte surface;

a thin coating of a metal layer on the top outer layer of one of said multilayer structures;

an adhesive layer bonding the metal layer on the top outer surface of one of said multilayer structures to the top outer surface of the other of said multilayer structures providing a bonded interface free of any printed indicia, at least one of said multilayer structures being clear for providing visibility through the thickness thereof to permit viewing of at least a portion of the coating of the metal layer with printed indicia on an outer matte surface.

2. The in-mold label of claim 1, wherein the bottom outer surfaces of said extruded multilayer structures are outer surfaces of the in-mold label, respectively, and both are matte surfaces.

3. The in-mold label of claim 1, wherein a clear, protective layer is applied over the printed indicia and is an outer layer of the in-mold label.

4. The in-mold label of claim 1, wherein the composition of the core and outer polymer layers in the first extruded multilayer structure being the same as the core and outer polymer layers in the second extruded multilayer structure.

5. The in-mold label of claim 4, wherein the opposed outer polymer layers thereof include matte surfaces.

6. The in-mold label of claim 1, wherein the core layer of each of said multilayer structures has a thickness in the range of 25-27 microns, the top layer of each of said multilayer structures has a thickness of 0.5-2 microns and the bottom layer of each of said multilayer structures has a thickness of 1.5-5 microns.

7. The in-mold label of claim 1, wherein each of said extruded multilayer structures is biaxially oriented.

* * * * *